US 6,749,314 B2

(12) United States Patent
Naghi et al.

(10) Patent No.: US 6,749,314 B2
(45) Date of Patent: *Jun. 15, 2004

(54) APPARATUS FOR ILLUMINATING A PORTABLE ELECTRONIC DEVICE AND METHOD FOR USING THE SAME

(75) Inventors: David Naghi, Los Angeles, CA (US); Gilbert Fregoso, Santa Ana, CA (US)

(73) Assignees: Technology Creations, Inc., Los Angeles, CA (US); Design Rite LLC, Fontana, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/298,384

(22) Filed: Nov. 18, 2002

(65) Prior Publication Data

US 2003/0072169 A1 Apr. 17, 2003

Related U.S. Application Data

(63) Continuation of application No. 09/715,844, filed on Nov. 17, 2000, now Pat. No. 6,527,409, which is a continuation-in-part of application No. 09/553,781, filed on Apr. 21, 2000, now Pat. No. 6,260,984, which is a continuation-in-part of application No. 09/330,322, filed on Jun. 11, 1999, now Pat. No. 6,186,636.

(51) Int. Cl.⁷ ............................................... F21V 33/00
(52) U.S. Cl. ........................................ 362/85; 362/253
(58) Field of Search .......................... 362/109, 85, 253, 362/226, 296, 285, 287

(56) References Cited

U.S. PATENT DOCUMENTS 1,651,307 A    11/1927   Wilkinson
3,065,339 A    11/1962   Fahey, Jr. et al. ............. 240/25

(List continued on next page.)

FOREIGN PATENT DOCUMENTS

| DE | 42 02 776 A1 | 8/1993 |
| DE | G 94 17 969.7 | 3/1995 |
| EP | 0 478 802 A1 | 4/1992 |
| FR | 2 754 588 | 4/1998 |
| GB | 2 113 818 A | 12/1981 |
| JP | 04-070626 | 3/1992 |
| JP | 09-211448 | 8/1997 |
| JP | 10-246886 | 9/1998 |
| JP | 10-326659 | 12/1998 |
| JP | 11-119206 | 4/1999 |
| JP | 2000-330110 | 11/2000 |
| WO | WO 92/06327 | 4/1992 |

OTHER PUBLICATIONS

Amazon.com product web page printout for "Adventure Book Light and Flashlight" by Lumatec; http://www/amazon.com/exec/obidos/ASIN/b00000IJZM/104–9549104–0986847; printed Mar. 2, 2000.

(List continued on next page.)

*Primary Examiner*—Sandra O'Shea
*Assistant Examiner*—Ali Alavi
(74) *Attorney, Agent, or Firm*—Procopio Cory Hargreaves & Savitch

(57) ABSTRACT

The present invention involves an apparatus for illuminating a display screen of a handheld portable video game device having a utility power jack or communication port in electrical connection with a power source. The apparatus includes a plug for plugging the apparatus into the utility power jack or communication port, a body connected to the plug, and an illumination device including one or more illumination devices attached to the body and electrically connected to the utility power jack through the plug and the body. The illumination device is powered by the power source when the apparatus is plugged into the utility power jack. Preferably, the one or more illumination devices include one or more Light Emitting Diodes ("LEDs").

4 Claims, 5 Drawing Sheets

U.S. PATENT DOCUMENTS

| | | | | |
|---|---|---|---|---|
| D238,959 S | 2/1976 | Kurokawa et al. | ........ | D48/20 F |
| D251,687 S | 4/1979 | Kurokawa | ............... | D48/20 F |
| 4,312,507 A | 1/1982 | Smith et al. | ................. | 273/237 |
| 5,091,832 A | 2/1992 | Tortola et al. | .............. | 362/109 |
| 5,122,937 A * | 6/1992 | Stoudemire | ................. | 362/109 |
| 5,122,941 A | 6/1992 | Gross et al. | ................ | 362/276 |
| 5,136,477 A | 8/1992 | Lemmey | ..................... | 362/198 |
| 5,172,974 A | 12/1992 | Riban | ......................... | 362/109 |
| 5,183,325 A | 2/1993 | Hurdle | ........................ | 362/109 |
| 5,203,622 A | 4/1993 | Sottile | ......................... | 362/109 |
| 5,247,314 A | 9/1993 | Stephenson | | |
| 5,379,201 A * | 1/1995 | Friedman | .................... | 362/191 |
| 5,486,986 A | 1/1996 | Brada | ........................... | 362/85 |
| 5,590,950 A | 1/1997 | Hildebrand | ................. | 362/109 |
| D377,840 S * | 2/1997 | Chang | ......................... | D26/63 |
| 5,615,945 A * | 4/1997 | Tseng | ........................ | 362/226 |
| 5,707,137 A | 1/1998 | Hon | ........................... | 362/183 |
| 5,803,572 A | 9/1998 | Brada | .......................... | 362/23 |
| 5,868,487 A | 2/1999 | Polley et al. | .................. | 362/33 |
| 5,899,553 A | 5/1999 | Howell | ......................... | 362/84 |
| D418,240 S | 12/1999 | Sherman | ..................... | D26/63 |
| D435,679 S | 12/2000 | Naghi et al. | ............... | D26/103 |
| 6,273,581 B1 * | 8/2001 | Neiser | ........................ | 362/109 |
| D476,106 S | 6/2003 | Kim | | |
| 6,575,593 B2 | 6/2003 | Krietzman | | |
| 2001/0048409 A1 | 12/2001 | Kim | | |

OTHER PUBLICATIONS

Book light product internet web page printout; http://store1.yimg.com/I/parksherman_1550_902141; printed Mar. 2, 2000.

"Designed Halogen Lamps With Multiple Features," *Taiwan Lighting*, Feb. 1997, p.69.

Igo.com product web page printout for "NBL–100 Notebook Light" by Interex; http://www.igo.com/cgi–bin/ncommerce3/ProductDisplay/prmenbr=1&prrfnbr–522530; printed Jul. 21,2000.

Sierra Gold Marketing "SGM28367" Clip On Light product web page printout; http://www.sgm.simplenet.com/boutique/special/sgm28367.htm; printed Mar. 2, 2000.

"The Itty Bitty Book Light" internet web page printout; http://www.zelco.com/10013.jpg; printed Mar. 2, 2000.

"Ultimate Palmtop Computer Lights®" internet web page printout; http://www.std.com/sfl/3.pct.html; printed Mar. 2, 2000.

Case No. 01–10825 DT (BQRx) First Amended Complaint for Declaratory Judgment of Patent Invalidity and Non–Infringement and for Injunctive Relief; Demand for Jury Trial. (Feb. 25, 2002).

Case No. 01–10825 DT (BQRx) Response to First Set of Interrogatories Propounded by Defendant Nyko Technologies, Inc. to Plaintiff Electro Source LLC. (Aug. 12, 2002).

Case No. 01–10825 DT (BQRx) Plaintiff Electro Source LLC's Response to Second Set of Interrogatories (Nos. 5–18) Propounded by Defendant Nyko Technologies, Inc. (Jan. 7, 2003).

Case No. 01–10825 DT (BQRx) Defendant Nyko Technologies, Inc.'s Opening Memorandum of Points and Authorities in Support of Claim Construction of U.S. patent Nos. 6,260,984 and 6,318,873. (Mar. 10, 2003).

Case No. 01–10825 DT (BQRx) Electro source LLC's Opposition to Nyko Technologies, Inc's Opening Memorandum in support of Claim Construction of U.S. patent Nos. 6,260,984,and 6,318,873. (Mar. 17, 2003).

Case No. 01–10825 DT (BQRx) Plaintiff Electro Source LLC's Supplemental Responses to Second Set of Interrogatories (Nos. 5–18) Propounded by Defendant Nyko Technologies, Inc. (Mar. 18, 2003).

Case No. 01–10825 DT (BQRx) Reply to Electro Source LLC's Opposition to Nyko Technologies, Inc's Opening Memorandum in Support of Claim Construction of U.S. patent Nos. 6,260,984 and 6,318,873. (Mar.24, 2003).

Case No. CV 01–10825 DT (MANx) Consolidated with: Case No. CV 02–00520 DT (MANx) Order Re Markman Hearing (Apr. 4, 2003).

Case No. CV 01–10825 DT (MANx) Consolidated with: Case No. CV 02–00520 DT (MANx) Joint Stipulation and Order Dismissing Without Prejudice Under F d. R. Civ. P. §41 (a)(2) The Mutual Claims and Counterclaims by the Parties (Jun. 30, 2003).

* cited by examiner

APPARATUS FOR ILLUMINATING A PORTABLE ELECTRONIC DEVICE AND METHOD FOR USING THE SAME

CROSS REFERENCE TO RELATED APPLICATIONS

This is a continuation of Ser. No. 09/715,844 filed Nov. 17, 2000 now U.S. Pat. No. 6,527,409, which continuation-in-part of U.S. patent application Ser. No. 09/553,781, filed Apr. 21, 2000 now U.S. Pat. No. 6,260,984, which is a continuation-in-part of U.S. patent application Ser. No. 09/330,322, filed Jun. 11, 1999 now U.S. Pat. No. 6,186,636.

FIELD OF THE INVENTION

The present invention relates, in general, to lighting devices and methods for illuminating a portable electronic or computing device, and, in particular, to lighting devices and methods for illuminating a screen of a handheld video game device.

BACKGROUND OF THE INVENTION

The GAME BOY® device sold by Nintendo and the NeoGeo Pocket™ sold by the SNK Corporation of America are examples of popular hand-held, portable, battery-powered video game devices that presently include a generally flat, liquid crystal display screen. The flat, liquid crystal display screens of these devices work well in well-lit areas. However, because these screens have not been backlit, when such devices are used in dimly lit areas or at night, it can be difficult, if not impossible, for a user to see anything in the viewing screen.

SUMMARY OF THE INVENTION

Accordingly, an aspect of the invention involves an apparatus for illuminating a display screen of a handheld portable video game device having a utility power jack or communication port in electrical connection with a power source. The apparatus includes a plug for plugging the apparatus into the utility power jack or communication port, a body connected to the plug, and one or more illumination devices attached to the body and electrically connected to the utility power jack through the plug and the body. The one or more illumination devices are powered by the power source when the apparatus is plugged into the utility power jack and may be used to illuminate the screen of the device, or other areas of the device or nearby objects. Preferably, the one or more illumination devices are one or more Light Emitting Diodes ("LEDs").

Another aspect of the invention involves an apparatus for illuminating a display screen of a handheld portable video game device having a battery compartment with at least one battery contact. The apparatus includes a case capable of forming a mechanical connection with the device, a power source located within the case, at least one electrical contact electrically coupled to the power source and adapted to contact the battery contacts of the device for powering the device when the case forms a mechanical connection with the device, a body connected to the case and electrically coupled to the power source, and an illumination device including one or more illumination devices attached to the body and electrically connected to the power source, wherein the one or more illumination devices are powered by the power source. As indicated above, the one or more illumination devices are preferably one or more LEDs.

A further aspect of the invention involves an apparatus for illuminating a display screen of a handheld portable video game device having an external power supply jack. The apparatus includes a case capable of forming a mechanical connection with the device, a power source located within the case, a power plug electrically coupled to the power source and adapted for insertion into the external power supply jack of the device for powering the device, a body connected to the case and electrically connected to the power source, and an illumination device including one or more illumination devices (preferably LEDs) attached to the body and electrically connected to the power source, wherein the one or more illumination devices are powered by the power source.

A further aspect of the invention involves a method of illuminating a display screen of a handheld portable video game device having a battery compartment with at least one battery contact. The method includes the steps of providing an apparatus including a case capable of forming a mechanical connection with the device, a rechargeable power source located within the case, at least one electrical contact electrically coupled to the rechargeable power source and adapted to come into contact with the at least one battery contact of the device for powering the device, a body coupled to the case and rechargeable power source, and one or more illumination devices (preferably LEDs) attached to the body; mechanically locking the apparatus to the device so as to place the at least one electrical contact of the apparatus in electrical communication with the at least one battery contact of the apparatus; and illuminating the portable electronic or computing device or a nearby object with the one or more illumination devices.

A still further aspect of the invention involves a method of illuminating a display screen of a handheld portable video game device. The method includes the steps of providing an apparatus including a case capable of forming a mechanical connection with the device, a power source located within the case, a power plug electrically coupled to the power source and adapted for insertion into the external power supply jack of the device for powering the device, a body coupled to the case and rechargeable power source, and one or more illumination devices (preferably LEDs) attached to the body; mechanically locking the apparatus to the device; inserting the power plug of the accessory into the external power supply jack of the device to secure an electrical connection between the apparatus and the device; and illuminating the portable electronic or computing device or nearby object with the one or more illumination devices.

These and further objects and advantages will be apparent to those skilled in the art in connection with the drawing and the detailed description of the preferred embodiment set forth below.

BRIEF DESCRIPTION OF THE DRAWINGS

The drawings illustrate the design and utility of preferred embodiments of the present invention, in which similar elements are referred to by common reference numerals.

DETAILED DESCRIPTION OF PREFERRED EMBODIMENTS

Figure 1:
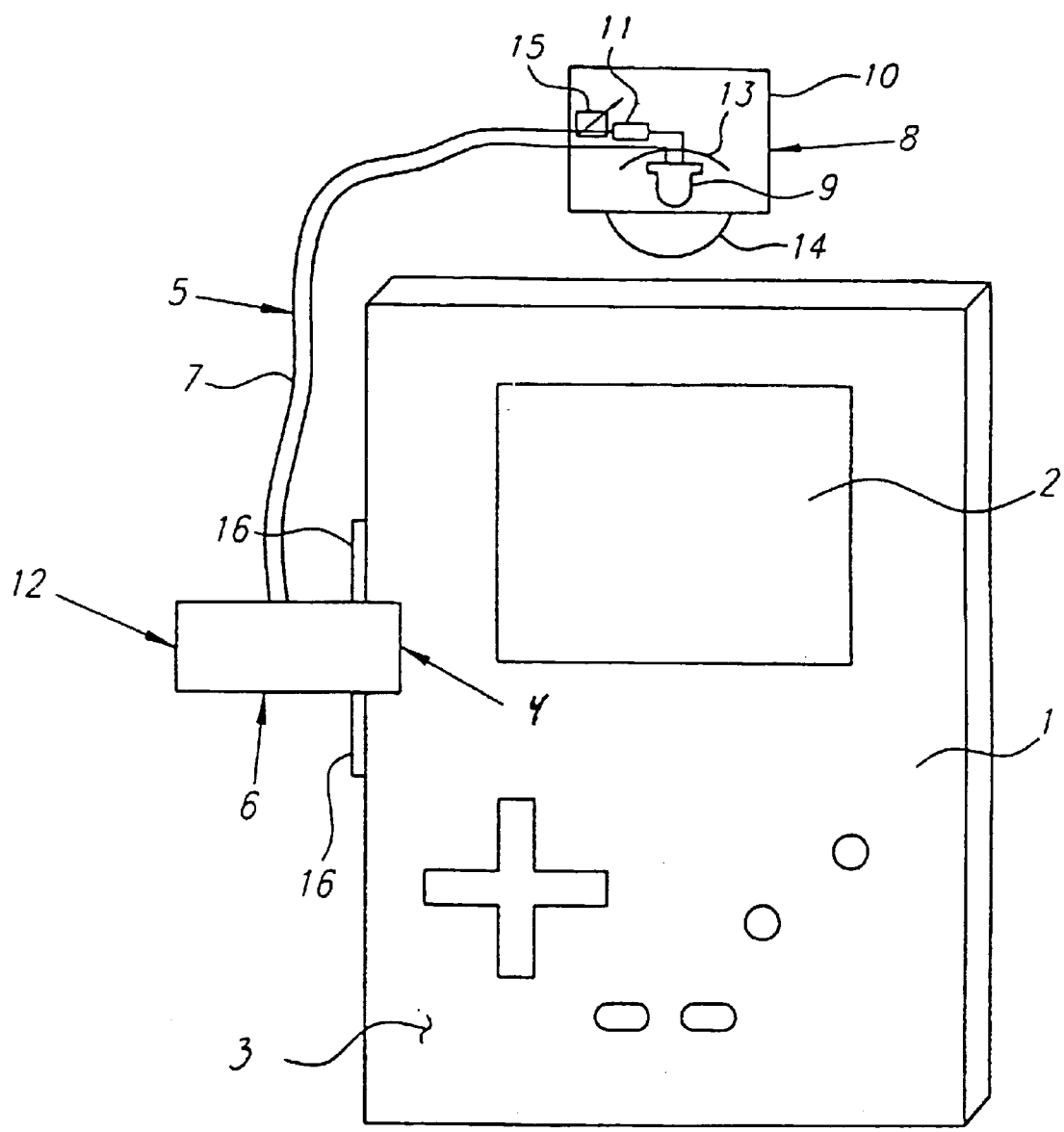
FIG. 1 is a schematic representation of an embodiment of an illumination accessory for a portable electronic or computing device.

FIG. 1 illustrates how an illumination accessory or apparatus 5 constructed in accordance with an embodiment of the present invention can be used with a portable handheld video game device such as the GAME BOY® or NeoGeo™ devices. Although this drawing depicts a handheld video game device, the apparatus is adaptable to any portable electronic or computing device that has a utility power jack (or communication port adapted to deliver some power) in electrical connection with a power source such as, but not limited to, a Personal Digital Assistant (PDA) (e.g., Palm Pilot™), a digital camera, an internet camera, a video camera, and a cellular or an internet phone. Further, the invention may be used for purposes other than illuminating the screen of the device. For example, the invention may be used to illuminate a keyboard of the device, illuminate a subject of the device (e.g., when used with a camera), or illuminate an object used with the device.

In the embodiment shown in FIG. 1, the electronic device 1 is a handheld portable video game device such as the NINTENDO® GAME BOY®. The device 1 includes a viewing or display screen 2 and a power source 3 in communication with a utility power jack or communication port 4 through appropriate electronic circuitry (not shown). The power source and utility power jack are shown generally as 3 and 4 because their location and configuration will vary depending upon the design of a given portable electronic or computing device.

The display screen 2 may be a non-backlit, flat, liquid crystal display screen. Alternatively, the display screen 2 may be another type of display screen and/or a display screen that is ineffectively lit.

The power source 3 may be self-contained such as one or more alkaline batteries in a battery compartment, or, as described below, may be an add-on rechargeable power source. The power source 3 may be augmented or replaced by plug-in capability (e.g., AC adapter) to a non-portable power source such as a wall outlet.

In the case of the device 1 being a NINTENDO® GAME BOY®, the utility power jack or communication port 4 is a communication port that has traditionally been used for communicating with other GAME BOY® devices for head-to-head video game competition. The inventors of the present invention recognized that in addition to being used for communication purposes, the port may be used for powering separate accessories. The inventors determined that the communication port of the GAME BOY® has a current level of approximately 20 ma at 5 volts (two 1.5 volt batteries).

An illumination apparatus 5 constructed in accordance with an embodiment of the invention includes a plug 6 for plugging the illumination apparatus 5 into the utility power jack 4 of the device 1. The exact configuration of the plug 6 should be designed so as to mate with the utility power jack 4 and create a mechanical and electrical connection between the utility power jack 4 and the plug 6 when the apparatus 5 is plugged into the device 1.

The illumination apparatus 5 also includes a body 7 and an illumination device 8. The body 7 connects the illumination device 8 to the plug 6, and the body 7 is preferably comprised of a flexible arm. The illumination device 8 is electrically connected to the utility power jack 4 through the plug 6 and the body 7 so that the illumination device 8 is powered by the power source 2 when the illumination apparatus 5 is plugged into the electronic device 1. The electrical connection between the illumination device 8 and the plug 6 can be established by any suitable means such as by a wire (not shown). It is especially preferred that the body 7 can be adjusted, when the apparatus 5 is plugged into the utility power jack 4, to adjust the height and/or the angle of the illumination device 8 relative to the electronic device 1. In order to prevent the movement of the apparatus in a direction away from the electronic device, one or more support wings 16 may be attached to the plug 6. These support wings 16 stabilize the plug 6 by providing surfaces that abut the electronic device 1, and, thereby, prevent rocking of the plug 6 in a plane of the support wings 16. They also make it less likely that the plug 6 will pull away from the electronic device 1 at the location of the support wings 16, thereby stabilizing the connection of the plug 6 to the electronic device 1.

The illumination device 8 is preferably one or more light emitting diodes ("LED") 9 housed in a case housing 10. In a preferred embodiment, a single LED 9 is housed in the case housing 10. However, in alternative embodiments, different numbers of LEDs 9, e.g., 2, 3, 4, etc. may be used. A LED 9 is advantageous because it is a low power drawing illumination device during operation. A low power illumination device means an illumination device that draws 20 ma or less in power. The low power draw is especially advantageous with respect to portable electronic or computing devices such as the GAME BOY® because these devices generally have little power available at the port 4 and the amount of power supplied by the power source 3 is limited. A higher power draw may not be available at the port 4, and, in the event the power is available, a higher powered light source may drain the limited power supply too quickly, possibly damaging the power source 3 and limiting the time that the device 1 could be operated. The LED 9 is small, lightweight and also does not burn out like conventional filament light bulbs, reducing maintenance of the apparatus 5. Because the LED 9 does not emit heat, the LED 9 uses the low power drawn efficiently and can be formed into plastic without the heat warping effects on the structure. The LED 9 also does not have a filament like conventional bulbs, therefore, it casts light in a more even and focused manner. Because of the low amount of power that the LED 9 draws, multiple LEDs 9 may be used in the illumination apparatus 5. Instead of multiple LEDs 9 being added to the illumination device 8, multiple LEDs 9 may be part of multiple illumination devices 8 in the illumination apparatus 5. The LED 9 is preferably a wide angle LED to more broadly distribute the light. A wide angle LED is a LED with an angle of 40-degrees or greater. The LED is also preferably a white LED. A white LED has the advantages of being a full-spectrum light that brings out the full, true colors of objects such as the colors generated on the display screen 2, while requiring very little power.

Figure 2A:
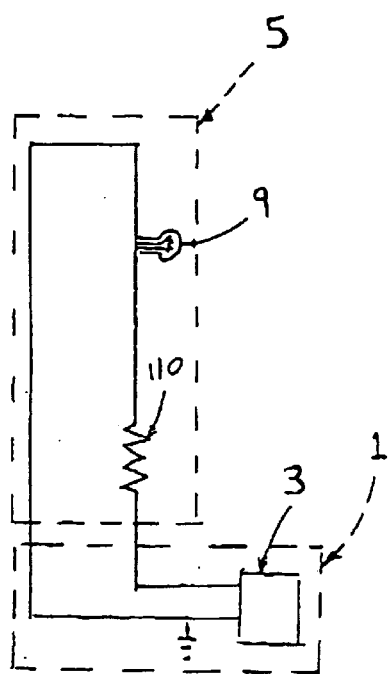
FIGS. 2A, 2B and 2C are respective electrical schematics of alternative embodiments of illumination accessories for handheld portable electronic or computing devices such as the handheld video game device illustrated in FIG. 1.
Figure 2B:
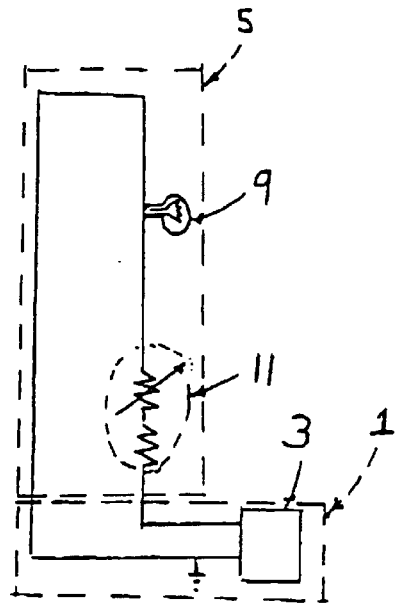
Figure 2C:
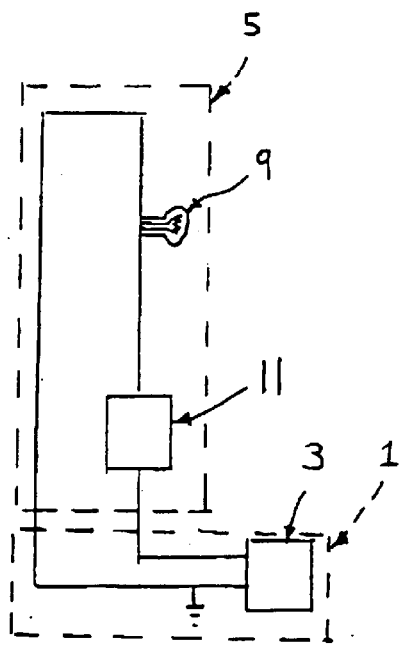

The housing 10 may include suitable electronics such as a resistor, variable resistor, and/or regulator 11 for varying the intensity of light given off by the LED 9. FIGS. 2A–2C are electrical schematics of alternative electrical circuit embodiments of the illumination apparatus 5 and are shown in conjunction with a simplified electrical representation of the device 1.

With reference to FIG. 2A, an embodiment of the illumination apparatus 5 may include the LED 9 in circuit with a fixed resistor 11. The resistor 11 is used to control the illumination of the LED 9 at a generally pre-selected illumination level determined, in part, by the pre-selected resistance of the resistor 11. In another embodiment, the LED 9 may be selected so that a separate resistor 11 is not required, i.e., the resistor 11 shown represents the internal resistance of the LED 9.

With reference to FIG. 2B, an additional embodiment of the illumination apparatus 5 may include the LED 9 in circuit with a variable resistor 11. The variable resistor 11 functions as a dimmer mechanism or brightness control mechanism for manually controlling the brightness of the LED 9. The variable resistor 11 may be operatively associated with a control wheel (similar to a volume control wheel) or similar mechanism to control the brightness of the LED 9.

With reference to FIG. 2C, a further embodiment of the illumination accessory 5 may include the LED 9 in circuit with a regulator 11. The regulator 11 is preferably a regulator circuit that supplies the LED 9 with a constant power level regardless of the input power level, which may vary, delivered from the device 1 to the illumination apparatus 5.

In other embodiments of the illumination apparatus 5, the apparatus 5 may include one or more LEDs 9 in circuit with one or more of the elements described above with respect to FIGS. 2A–2C.

The housing may include additional features such as a diffuser 14. A diffuser breaks up the narrow light of the LED 9 and softens the light, thus avoiding "hot spots" on the screen 2 and glare that may distract the user. The diffuser 14 can alternatively be replaced by a magnifier 14 that focuses the light on the screen 2, rendering it easier to see the details of the screen 2. The magnifier 14 also focuses the light where it is needed, avoiding waste and optimizing the low power consumed by the LED 9. Another feature that may be included is a reflector 13 that concentrates the light toward the object to be illuminated while also helping to minimize back-scatter of light generated by the illumination device 8. The reflector 13 includes a mirrored surface on the bottom of the reflector 13 for reflecting light away from the user. The housing 10 can also include an opaque surface at its end distant from the desired travel of light so as to minimize undesirable back-scatter of light toward a user's eye.

When the plug 6 of the illumination apparatus 5 is plugged into the utility power jack or communication port 4 of the electronic device 1, it necessarily occupies the connection that the utility power jack or communication port 4 would otherwise provide to a user of the electronic device 1. Because a user of the electronic device 1 might need to connect some other device to the utility power jack or communication port 4, the plug 6 may be constructed so as to include a second utility power jack 12. The second utility power jack 12 is adapted to receive a second plug and provide a mechanical and electrical connection for the second plug equivalent to that which is provided by the first utility power jack 4. Thus, the second utility power jack 12 will provide electrical communication for the second plug with the first utility power jack 4 when the second plug is plugged into the second utility jack 12 of the first plug 6 and the first plug 6 is plugged into the first utility power jack 4.

The present invention is also adaptable to a portable computing device with a display screen that is not illuminated by the portable computing device. In such an embodiment, the illumination apparatus is plugged into a utility port of the computing device in electrical connection with a power source instead of the utility power jack 4 of the electronic device 1. In such a device, the utility port can be any port that allows connection of additional products or communication devices, or cables, or any additional accessory or product that also includes power. The illumination apparatus 5 can have a second utility port adapted to receive a second plug that is in electrical communication with the first utility port when the second plug is plugged into the first plug and the first plug is plugged into the first utility port. In all other respects, the structure and function of the illumination apparatus 5 would be the same as for the illumination apparatus 5 described above in connection with electronic device 1.

Figure 3:
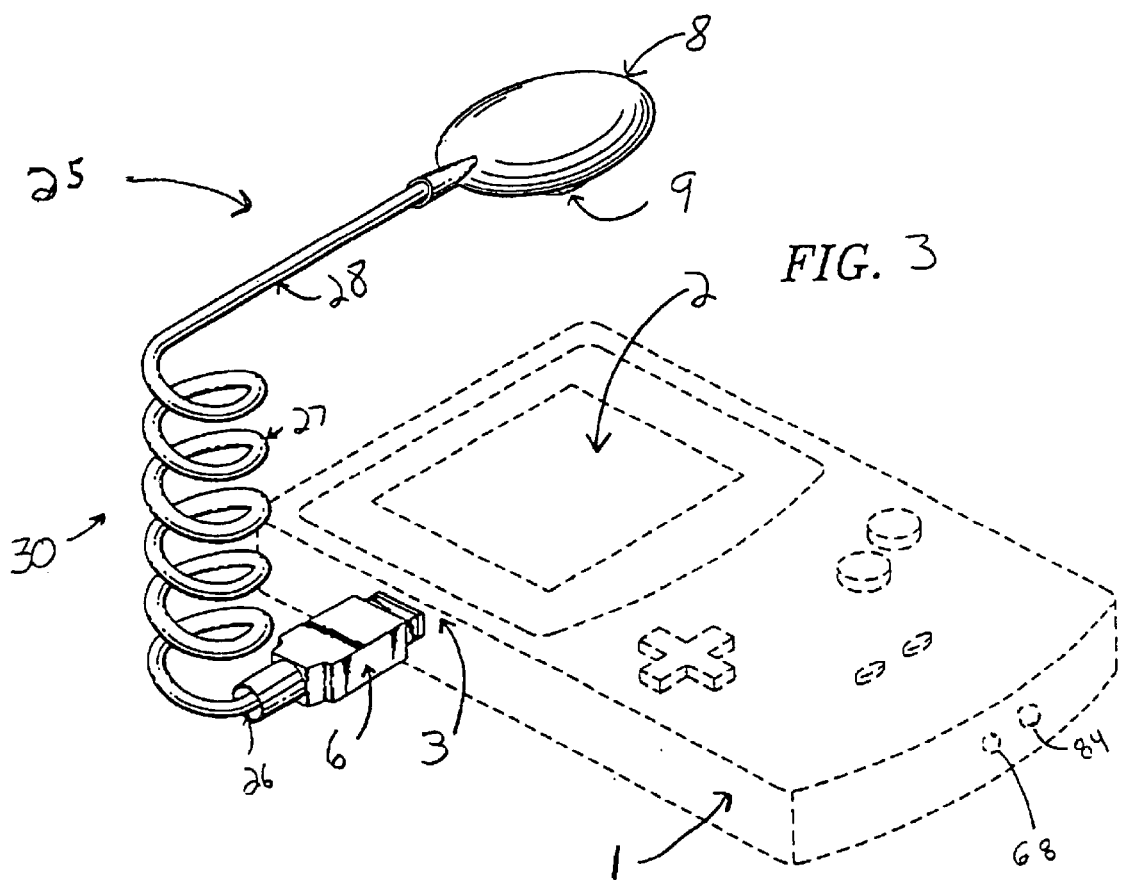
FIG. 3 is a perspective view of an alternate embodiment of an illumination accessory for a portable electronic or computing device.

With reference to FIG. 3, an illumination apparatus 25 constructed in accordance with another embodiment of the invention will now be discussed. The plug 6 and the illumination device 8 of this embodiment are similar to those described above with respect to FIG. 1. This embodiment, however, differs from the apparatus 5 described with respect to FIG. 1 in that the illumination apparatus includes a non-linear body 30. The non-linear body 30 has three portions: a first portion 26 that connects to the plug 6, a second non-linear main body portion 27 that connects to the first portion 26, and a third portion 28 that connects to the illumination device 8 and the nonlinear main body portion 27.

The non-linear main body portion 27 may be non-linearly shaped such as, but not by way of limitation, coiled, helical, serpentine, wave-like, sinusoidal, and crenellated. In the preferred embodiment shown, the main body portion 27 is helical. While FIG. 3 depicts this embodiment with five coils, the non-linear main body portion 27 may contain fewer or additional coils.

Figure 4:
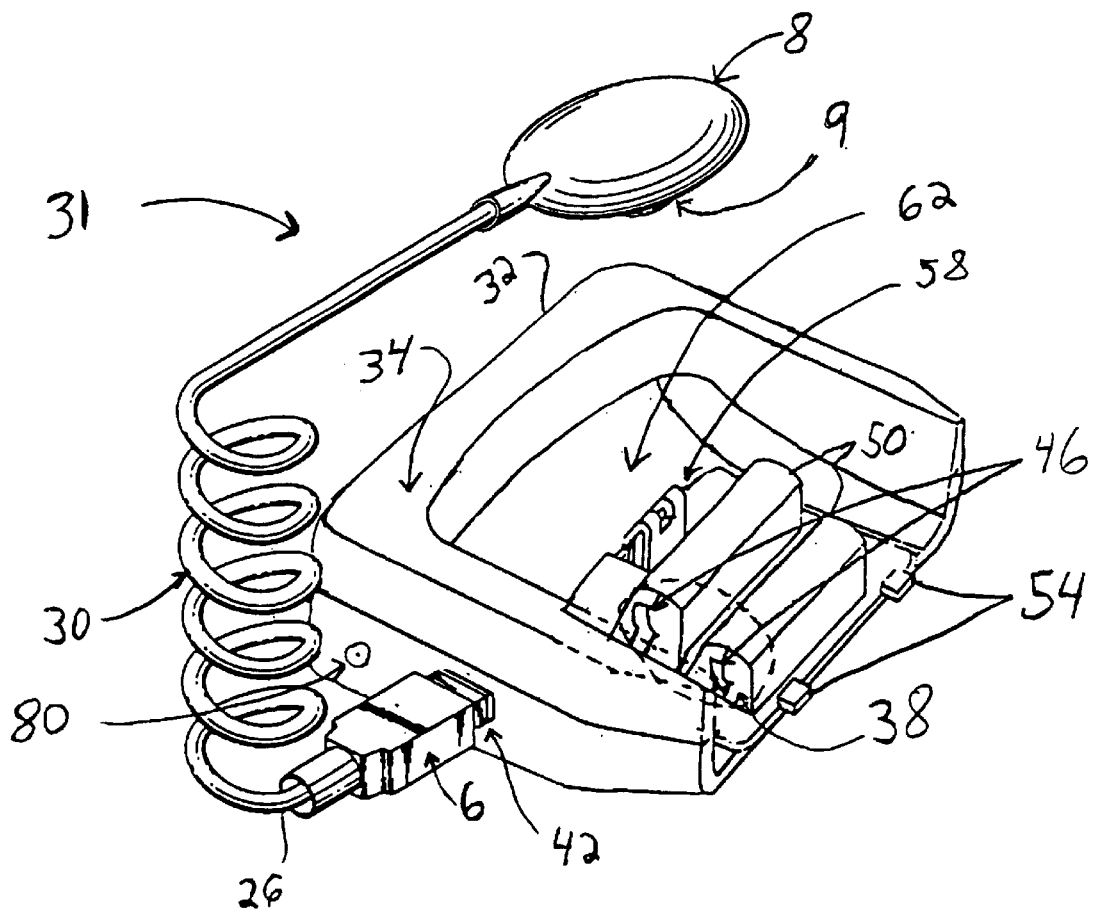
FIG. 4 is a perspective view of an alternate preferred embodiment of an illumination accessory for a portable electronic or computing device.

With reference to FIG. 4, an illumination apparatus 31 constructed in accordance with another embodiment of the invention will now be described. The illumination apparatus 31 is similar to the illumination apparatus 28 described above with respect to FIG. 3, but the apparatus 31 additionally includes a case 32 with a power supply 34 that supplies power to the portable electronic device 1. Such an embodiment is advantageous where the electronic device 1 does not output enough power through the utility power jack or utility port 4 to power an illumination apparatus such as those described above with respect to FIGS. 1 and 2, or if the device or other object to be lighted does not include a utility power jack or communication port. In one embodiment, the illumination apparatus 31 may be an integrated assembly. In this embodiment, the first portion 26 of the body 30 may be integrated with the case 32. In another embodiment, the illumination apparatus 31 may be a two-piece assembly. In this embodiment, the plug 6 may plug into a power jack 42 of the case 32 and the power jack 42 is in electrical communication with the power supply 34 such that mating the plug 6 with the power jack 42 (when the device 1 is on) powers the illumination device 8.

The case 32 includes an electrical power connector 38 electrically coupled to the power supply 34 and adapted to be connected to the electronic device 1 for powering the device 1. The power supply 34 is preferably one or more rechargeable batteries, but in alternative embodiments, may be one or more batteries, fuel cells, an AC adapter to be plugged into a wall outlet, or any other suitable power source. The electrical power connector 38 preferably includes one or more electrical contacts 46 mounted to a pair of generally battery-shaped protrusions 50.

The case 32 is adapted to be removably mounted to a battery compartment of the portable electronic device 1. The battery compartment of the device 1 may include a pair of slots at a top portion of the battery compartment and a groove or slot located at a lower portion of the battery compartment to mechanically secure a battery compartment cover. Preferably, the apparatus 31 is used with the battery compartment cover removed from the electronic device 1. The apparatus 31 includes two flat tabs 54 that are adapted to slide into the slots at the top portion of the battery compartment of the electronic device 1. A detent clip 58 protrudes inwardly from a rear wall 62 of the case 32 and is adapted to snap into the existing slot or groove at the lower portion of the battery compartment of the electronic device 1. When the case 32 is attached to the portable electronic device 1, the flat tabs 54 and the detent clip 58 slide into the respective slots of the electronic device 1 for mechanically connecting the case 32 to the device 1. The pair of generally battery-shaped protrusions 50 replace the batteries that would normally reside in the battery compartment of device 1, and the pair of electrical contacts 46 communicate with a corresponding pair of electrical contacts in the battery compartment of device 1 to electrically couple the power supply 34 of the illumination apparatus 31 to the portable electronic device 1 for powering the device 1.

The case 32 of the illumination apparatus 31 may include an alternating current ("A/C") power jack 80 that is electrically coupled to the rechargeable batteries. Connecting an A/C adapter to the A/C power jack 80 will recharge the rechargeable batteries, and may at the same time provide power to the device 1 through either of the electrical contacts 46.

Figure 5:
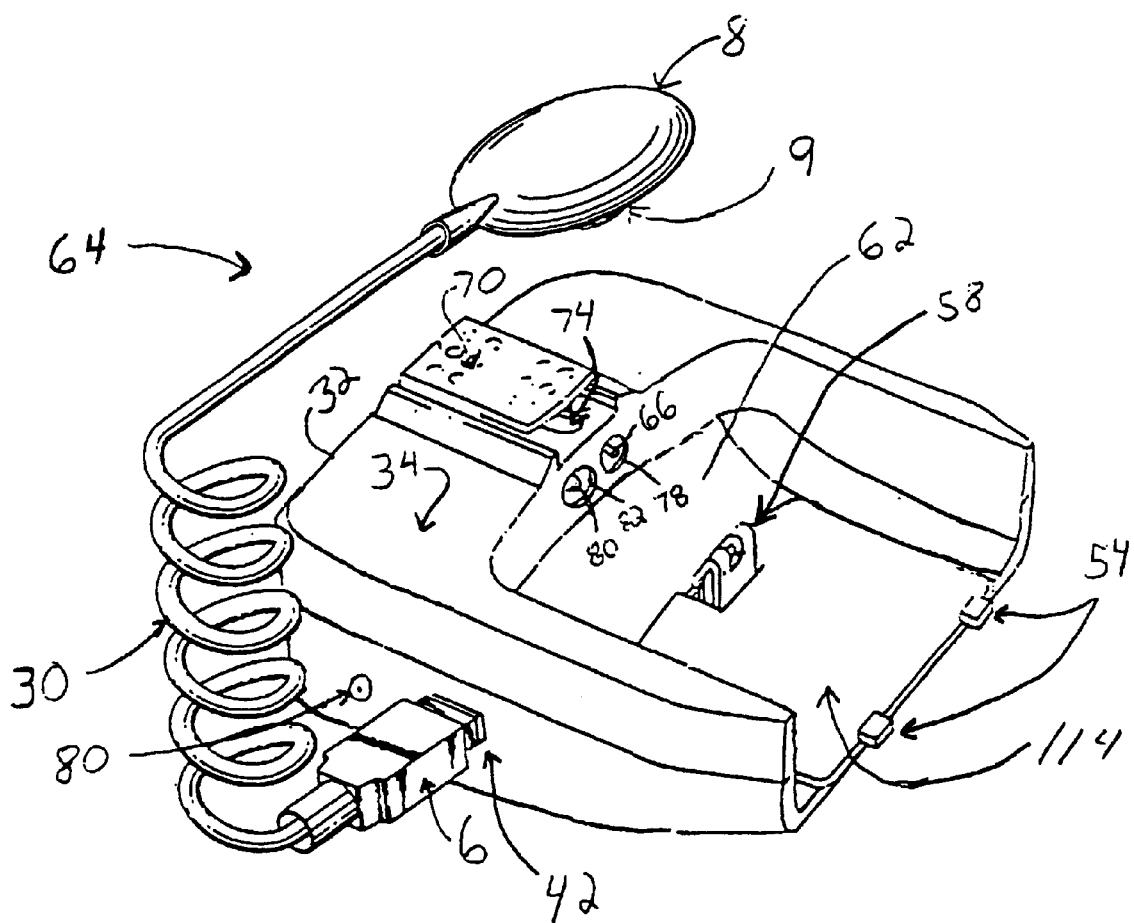
FIG. 5 is a perspective view of a further embodiment of an illumination accessory for a portable electronic or computing device.

With reference to FIG. 5, an illumination apparatus 64 constructed in accordance with a further embodiment of the invention will now be described. The illumination apparatus 64 is similar to the illumination apparatus 31 described in conjunction with FIG. 4, but instead of the electrical power connector 38 (FIG. 4), the apparatus includes a movable power plug 66 adapted to mate with an external power supply jack 68 (FIG. 3) on the device 1 to couple the power supply 34 of the illumination apparatus 64 to the portable electronic device 1. A tab 70 is slidably secured along an elongated aperture 74 of the case 32. The power plug 66 is connected to an internal portion of the tab 70 for slidable movement through an aperture 78 with corresponding slidable movement of the tab 70. When the case 32 is attached to the electronic device 1 in the manner described above, slidable movement of the tab 70 to a completely forward position causes the power plug 66 to mate with the external power supply jack 68 of the device 1 for powering the device 1. A connection plug 80 may also be connected to an internal portion of the tab 70 for slidable movement through an aperture 82 for mating with a communication jack 84 (FIG. 3) on the device 1 to couple electronics within the case 32 with the portable electronic device 1. The electronics within the case 32 may be used for purposes such as, but not by way of limitation, providing additional memory for the device 1, providing stereo speaker sound from the case 32, and providing vibrational forced feedback from the case 32.

It will be readily apparent to those skilled in the art that still further changes and modifications in the actual concepts described herein can readily be made without departing from the spirit and scope of the invention as defined by the following claims.

What is claimed is:

1. A light assembly for use in enhancing the view of a video screen of a compact computer device, the compact computer device having a power supply, an on/off power switch and a link port, the lighting assembly comprising:

a plug to plug into the link port of the compact computer device to obtain power;

a light source operatively connected to said plug and directing light away from the video screen; and reflecting means being positioned to reflect the light directed away from the video screen back toward the video screen.

2. The light assembly according to claim 1, further comprising an external link port that provides another link port while said plug is disposed within the link port of the compact computer device.

3. The light assembly according to claim 1, wherein said light source comprises a light emitting diode.

4. The light assembly according to claim 1, wherein said reflecting means comprise a mirror.

* * * * *